US009600205B1

(12) United States Patent
Nowell et al.

(10) Patent No.: US 9,600,205 B1
(45) Date of Patent: Mar. 21, 2017

(54) POWER AWARE POWER SAFE WRITE BUFFER

(71) Applicant: Western Digital Technologies, Inc., Irvine, CA (US)

(72) Inventors: Shane G. Nowell, Boise, ID (US); Wayne H. Vinson, Longmont, CO (US); Travis D. Fox, Edmond, OK (US); Danny J. Kastler, Longmont, CO (US); Edwin Scott Olds, Fort Collins, CO (US)

(73) Assignee: Western Digital Technologies, Inc., Irvine, CA (US)

( * ) Notice: Subject to any disclaimer, the term of this patent is extended or adjusted under 35 U.S.C. 154(b) by 30 days.

(21) Appl. No.: 14/492,439

(22) Filed: Sep. 22, 2014

(51) Int. Cl.
*G06F 3/06* (2006.01)
*G06F 12/08* (2016.01)

(52) U.S. Cl.
CPC .......... *G06F 3/0659* (2013.01); *G06F 3/0625* (2013.01); *G06F 3/0656* (2013.01); *G06F 3/0683* (2013.01); *G06F 12/0866* (2013.01); *G06F 2003/0691* (2013.01); *G06F 2003/0692* (2013.01); *G06F 2212/281* (2013.01)

(58) Field of Classification Search
CPC ............. G06F 11/1456; G06F 11/2074; G06F 11/2071; G06F 11/1451; G06F 11/2082; G06F 12/0246; G06F 3/0679; G06F 2212/2022; G06F 2212/7211; G11C 16/102

See application file for complete search history.

(56) References Cited

U.S. PATENT DOCUMENTS

| | | |
|---|---|---|
| 6,018,789 A | 1/2000 | Sokolov et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |

(Continued)

*Primary Examiner* — Shawn X Gu
*Assistant Examiner* — Jean Edouard
(74) *Attorney, Agent, or Firm* — Brownstein Hyatt Farber Schreck, LLP

(57) ABSTRACT

Embodiments described herein relate to systems and methods for decreasing power consumption of a storage device. More specifically, embodiments disclosed herein are directed to reducing power consumption of a data storage device by enabling a command buffer associated with the data storage device to store received commands without executing the commands until a predetermined number of commands have been stored in the buffer.

20 Claims, 7 Drawing Sheets

(56) References Cited

U.S. PATENT DOCUMENTS

| | | |
|---|---|---|
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,523,086 B1 * | 2/2003 | Lee .................... G06F 12/0866 711/113 |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |

(56) References Cited

U.S. PATENT DOCUMENTS

| | | |
|---|---|---|
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,840,751 B2 | 11/2010 | Lubbers |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,925,825 B2 | 4/2011 | Brittain |
| 7,929,234 B1 | 4/2011 | Boyle et al. |
| 7,930,469 B2 | 4/2011 | Brittain |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |

(56) References Cited

U.S. PATENT DOCUMENTS

| | | |
|---|---|---|
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,364,992 B2 | 1/2013 | Guthrie |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Pruett et al. |
| 8,756,382 B1 | 6/2014 | Carlson et al. |
| 8,769,593 B1 | 7/2014 | Elliott et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton et al. |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2001/0011323 A1* | 8/2001 | Ohta ............ G06F 3/061 711/112 |
| 2003/0056034 A1* | 3/2003 | Olds ............ G06F 3/0601 710/5 |
| 2004/0202073 A1* | 10/2004 | Lai ............ G06F 3/0625 369/47.33 |
| 2006/0047897 A1* | 3/2006 | Thiessen ............ G11B 20/10 711/112 |
| 2007/0016725 A1* | 1/2007 | Chu ............ G06F 3/0616 711/113 |
| 2007/0283086 A1* | 12/2007 | Bates ............ G06F 3/0613 711/113 |
| 2008/0209103 A1* | 8/2008 | Haga ............ G11B 5/40 711/100 |
| 2009/0006689 A1* | 1/2009 | Lubbers ............ G06F 3/061 710/112 |
| 2009/0066689 A1* | 3/2009 | Yamaguchi ............ G06T 1/0028 345/418 |
| 2009/0113702 A1 | 5/2009 | Hogg |
| 2009/0193121 A1* | 7/2009 | Shin ............ G06F 3/061 709/225 |
| 2010/0199033 A1* | 8/2010 | Nguyen ............ G06F 3/0613 711/104 |
| 2010/0306551 A1 | 12/2010 | Meyer et al. |
| 2011/0161555 A1* | 6/2011 | Olds ............ G06F 12/0866 711/103 |
| 2011/0226729 A1 | 9/2011 | Hogg |
| 2011/0283044 A1* | 11/2011 | Olds ............ G06F 11/004 711/102 |
| 2012/0159042 A1 | 6/2012 | Lott et al. |
| 2012/0260047 A1* | 10/2012 | Haines ............ G06F 3/0613 711/154 |
| 2012/0275050 A1 | 11/2012 | Wilson et al. |
| 2012/0281963 A1 | 11/2012 | Krapf et al. |
| 2012/0317354 A1* | 12/2012 | Yokota ............ G06F 3/0625 711/113 |
| 2012/0324980 A1 | 12/2012 | Nguyen et al. |
| 2013/0191607 A1* | 7/2013 | Walls ............ G06F 11/2087 711/162 |
| 2013/0262762 A1* | 10/2013 | Igashira ............ G06F 12/00 711/114 |
| 2013/0318283 A1* | 11/2013 | Small ............ G06F 12/0246 711/103 |

(56) References Cited

U.S. PATENT DOCUMENTS

| | | |
|---|---|---|
| 2014/0201424 A1 | 7/2014 | Chen et al. |
| 2015/0046605 A1* | 2/2015 | Barrell .................. G06F 3/0611 710/5 |
| 2015/0286438 A1* | 10/2015 | Simionescu ........ G06F 12/0866 711/103 |

* cited by examiner

POWER AWARE POWER SAFE WRITE BUFFER

TECHNICAL FIELD

The present disclosure is directed to data storage systems. More specifically, the present disclosure is directed to a data storage device having an internal command queue that is configured to store received commands and execute them in a manner that provides increased power savings without adversely impacting performance.

BACKGROUND

Many computing systems generate or receive data and store the data in a data storage device such as a hard disk drive ("HDD"). In typical computing systems, when data is accessed or stored, the HDD expends power. For example, when data is requested, the HDD performs a seek and also performs a read command. Each operation causes the HDD to move its actuator arm to position the head and rotate the magnetic media at a certain speed for data access which increases power consumption of the HDD. As power is consumed by the HDD, the temperature of the HDD may increase. As the temperature of the HDD increases, additional power (possibly external to the HDD) may be used to cool the HDD or otherwise maintain the temperature of the HDD. Use of power in this way may cost a consumer or user of the HDD a significant amount of money over the life of the HDD.

It is with respect to these and other general considerations that embodiments have been made. Although relatively specific problems have been discussed, it should be understood that the embodiments should not be limited to solving the specific problems identified in the background.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

DETAILED DESCRIPTION

Figure 1:
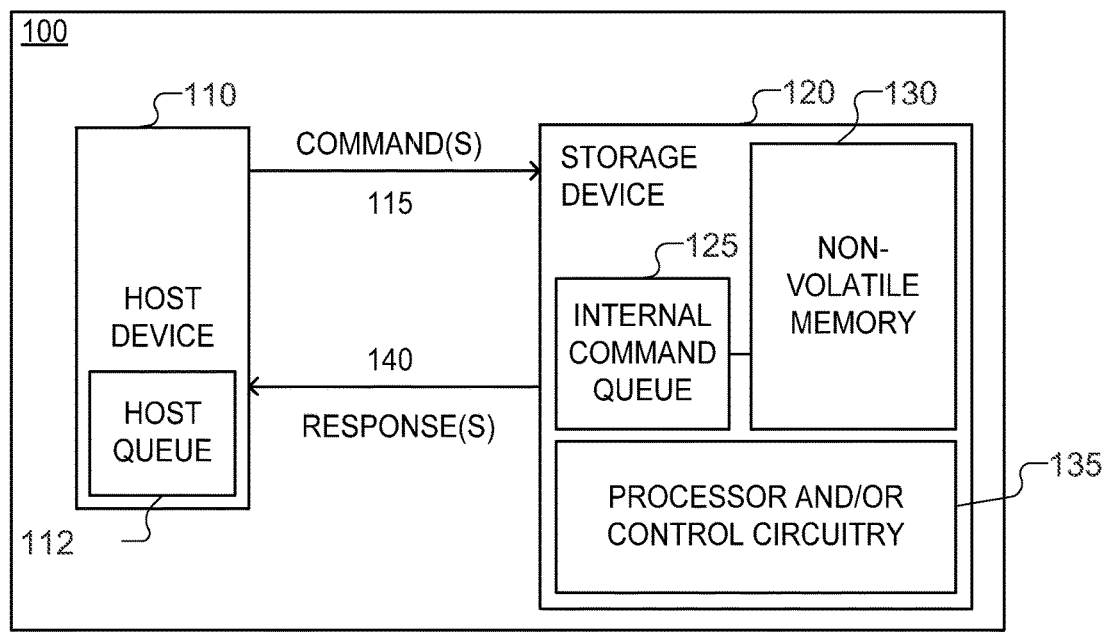
FIG. 1 illustrates an exemplary system for writing commands to a data storage device according to one or more embodiments the present disclosure.

Various embodiments are described more fully below with reference to the accompanying drawings, which form a part hereof, and which show specific exemplary embodiments. However, embodiments may be implemented in many different forms and should not be construed as limited to the embodiments set forth herein.

Some embodiments described herein relate to systems and methods for decreasing power consumption of a storage device. As will be explained in detail below, power consumption of a system, and more particularly, power consumption of a data storage device, may be reduced by enabling a command queue associated with the data storage device to store received commands without executing the commands until a predetermined number of commands have been stored in the queue.

More specifically, embodiments of the present disclosure are directed to a data storage device having a power safe write buffer that stores data related various commands that are received from a host device (e.g., data associated with incoming host write commands that are to be written to permanent storage). In some embodiments, the power safe write buffer may be associated with an internal command queue that is configured to the store and enable sorting and/or ordering the received commands.

As briefly discussed above, when a command is received from the host device, and more particularly when a write command is received from the host device, the received command is stored in an internal command queue. The host device may receive an acknowledgement that the write command has been completed, when in fact the data has just been stored in the power safe write buffer. The received commands are continually stored in the command queue until a depth of the internal command queue exceeds a predetermined threshold. When a depth of the internal command queue exceeds a predetermined threshold, one or more of the write commands in the internal command queue are performed. However, if the internal command queue depth does not exceed the predetermined command queue depth threshold, the stored commands are not performed.

The performance of the one or more write commands in the command queue causes the depth of the internal command queue to decrease. The write commands continue to be executed until the depth of the internal command queue reaches a minimum threshold. Once the minimum threshold is met, any commands that have not yet been executed, and any additional received commands, are stored in the internal command queue until the predetermined number of commands is again reached.

Thus, taking the example where the data storage device is an HDD or SSHD, unlike conventional HDD in which in which a peak acceleration of the actuator in the mechanical seek motion is reached for each received command (and in which the peak acceleration is followed by a baseline phase and a braking phase, all of which consumer power), some embodiments of the present disclosure effectively average out the amount of power consumed by executing various commands, including write commands.

For example, the storage device may be given a workload that consists partly or entirely of random writes at arbitrary locations on the storage device. However, because writes may not occur in the disclosed embodiments until a queue depth reaches a predetermined depth, when the writes are eventually performed, the amount of power consumed is averaged (and is therefore lower) across all the write commands performed by the system.

FIG. 1 illustrates an exemplary system 100 for writing data to a storage device 120 according to one or more embodiments of the present disclosure. As shown in FIG. 1, the system 100 may include a host device 110 and a storage device 120. The host device 110 may be any suitable electronic device such as a laptop computer, desktop computer, server, cellular phone, tablet computer, and so on. In some embodiments, the host device 110 can be implemented as a system of individual electronic devices, for example, as a network of servers. The storage device 120 may include one of more of the following: a hard disk drive (HDD), a solid-state drive (SSD), or a solid-state hybrid drive (SSHD), for example.

The host device 110 may be configured to send various commands 115 to the storage device 120. The commands 115 can be any number of commands including, but not necessarily limited to: write commands, including both random write commands and sequential write commands and read commands, including both random read command and sequential read commands.

Further, the host device 110 may be configured to provide the commands 115 to the storage device 120 separately, simultaneously, or substantially simultaneously. For example, a read command may be followed by another read command followed by a write command. In some embodiments, each of these commands 115, prior to being provided to the storage device 120, may be stored in a host command queue 112.

When the storage device 120 receives the various commands 115 from the host device 110, the storage device 120 may be configured to return a response 140 to the host device 110. In one example, if the host device 110 sends a read command 115 to the storage device 120, the storage device 120 can send a response 140 to the host device 110 including the requested data. In some embodiments, the response 140 may include a time stamp that indicates when the command 115 was received, when the command 115 was executed or a combination thereof. In another example, the host device 110 may send a write command (e.g., a random write command or a write command that involves a seek) to the storage device 120. In response to receiving the write command, the system memory may send a response to the host device 110 that the write was performed.

Although the response 140 may indicate to the host device 110 that the write command has been completed, the storage device 120 may not have actually executed the command as indicated. For example, the storage device 120 may include, or otherwise be associated with, an internal command queue 125 that stores the write commands. In some situations, the data associated with the write commands maybe temporarily stored in a write buffer (e.g., a power safe write buffer) without actually writing the data to a non-volatile memory 130, which may include non-volatile memory such as rotating magnetic media, solid-state memory or other non-volatile memory. In some embodiments, at some point later, when the commands in the internal command queue 125 are processed, contents of the write buffer (e.g., power safe write buffer) are written to the non-volatile memory 130.

In some embodiments, the data storage device is configured to communicate with the host device 110 that the commands have been successfully executed when the data is in the write buffer only (although the commands have not been executed as discussed above and thus not yet written to the non-volatile memory 130). In some embodiments, the host device 110 may be configured to agree or otherwise grant permission to the storage device 120 to save data in this manner as a power loss may cause the unwritten data to be lost, if the write buffer is not a power safe write buffer.

Although the received commands 115 may not have been executed, in the implementations discussed herein, in one embodiment the storage device 120 includes a power safe write buffer and is thus configured to protect the data from loss even in the event of lost power. For example, in the event of a power loss, the power safe write buffer can still write the unwritten commands to the non-volatile memory 130 by using residual energy (e.g., back electromotive force (EMF)) stored in the spinning disk portion (or energy stored in various capacitors) of the storage device 120 in order to copy all or designated portions of the data in the power safe write buffer and/or commands in the command queue 125 to a serial flash device (or any non-volatile storage device). In some embodiments, the power safe write buffer comprises a non-volatile solid-state flash memory device.

Because the power safe write buffer enables commands to be saved in this manner, the internal command queue 125 associated with the storage device 120 may be effectively decoupled from the host command queue 112 (this is also the case where the write buffer is not power safe as long as such data loss risk is acceptable to the host device). More specifically, the host device 110 may continue to send commands 115 to the storage device 120 because the host device 110 receives acknowledgement from the storage device 120 that the commands have already been completed. Thus, when a response 140 is received by the host device 110, the host device 110 may send one or more additional commands 115 to the storage device 120.

As discussed above, the internal command queue 125 may be configured to store various commands 115 that are received from the host device. More specifically, the internal command queue 125 may store various write commands, including random write commands, in the internal command queue 125. In some embodiments, the internal command queue 125 maintains a queue depth, or a count, that tracks or otherwise stores the number of commands that are stored in the internal command queue 125. In some embodiments, the queue depth is a steady state depth that ranges in powers of two from 1-128 or from 1-64 although other ranges may be used.

When the queue depth of the internal command queue 125 reaches a predetermined threshold amount, the storage device 120 begins executing the commands and storing and/or writing data into the various locations in non-volatile memory 130. For example, if the internal command queue 125 can store up to 64 commands but has a predetermined threshold (e.g., a queue depth) of 50 commands, the stored commands are only executed once the predetermined number of commands has been stored. Although specific examples of queue depth and stored commands have been used, it is contemplated that the queue depth and the predetermined queue depth may be any size.

In some embodiments, the order at which the stored commands are executed may be determined by an ordering algorithm. In other embodiments, a processor and/or control circuitry 135 associated with the storage device 120 and/or the command queue may be configured to determined which commands are executed an in which order. For example, the commands may be sorted, organized or otherwise arranged using an order algorithm such as a rotational positional ordering method to group as many commands together as possible so less time and energy may be taken to write the commands to the various locations in non-volatile memory 130 (e.g., various physical locations on the magnetic media of a HDD). In other embodiments and as will be described below, the commands may be sorted and/or stored using a ladder or elevator sorting technique. As will also be discussed in greater detail below, because the write commands are stored and executed in this manner, less power is consumed for each executed write command. As a result, the cost of operating the system 100 decreases.

As also shown in FIG. 1 and briefly discussed above, the storage device 120 may include a processing unit or control circuitry 135. The control circuitry 135 can be implemented as an electrical circuit, an integrated circuit, or as instructions executed by a processor associated with the storage device 120 or the system 100. In many embodiments, the control circuitry 135 can perform or coordinate one or more operations of the storage device 120 and/or system 100. For example, the control circuitry 135 can determine which writes in the command queue 125 are to be performed or may also control the speed at which the writes are performed.

For example, in some embodiments, the control circuitry 135 may cause the writes commands to be executed at a slower rate than the commands 115 are received from the host device 110. As such, the depth of the command queue 125 may continue to increase until the predetermined depth is reached. Once the predetermined depth is reached, the commands in the internal command queue are executed such as described above.

For example, commands may be executed at a first rate which causes the depth of the internal command queue 125 to increase. Once the depth of the internal command queue 125 reaches the predetermined threshold, the commands are executed at a second rate that is greater than or faster than the first rate. The commands are executed at this pace until the depth of the internal command queue 125 reaches a predetermined minimum threshold. At that point, execution of received commands may again proceed at the first rate.

Figure 2:
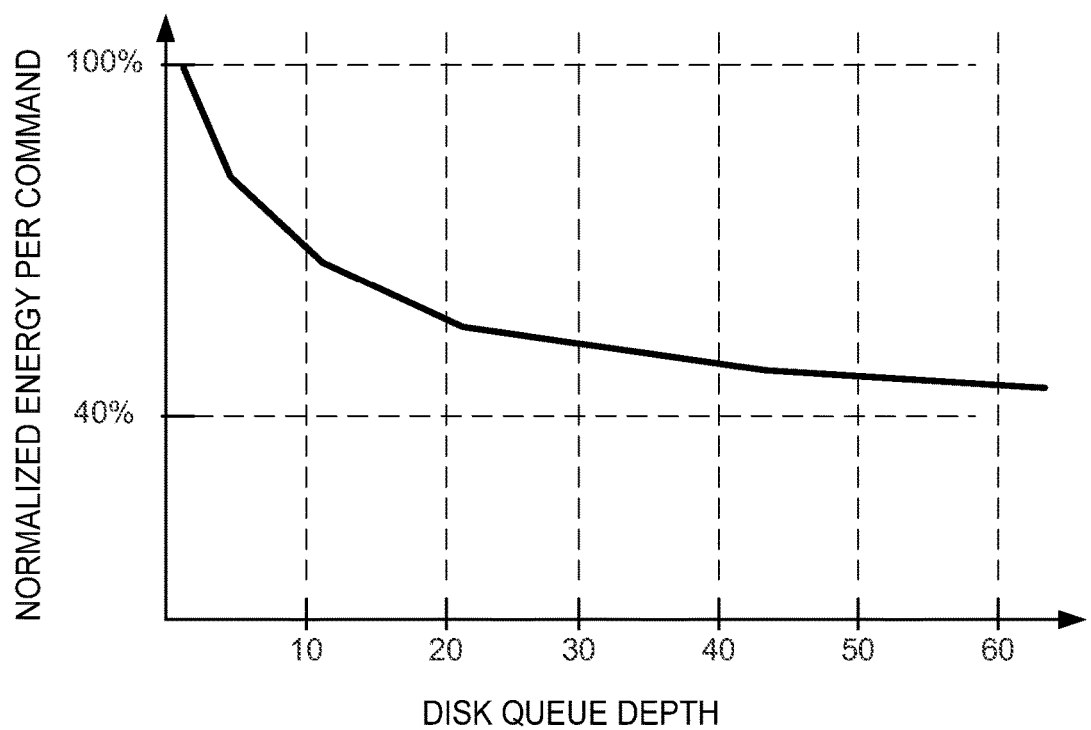
FIG. 2 is a graph that illustrates an amount of energy used per command according to one or more embodiments of the present disclosure.

FIG. 2 is a graph that illustrates an exemplary amount of energy that may be used by a storage device to execute various commands according to one or more embodiments of the present disclosure. More specifically, FIG. 2 illustrates that as a depth of an internal command queue increases (e.g., as more commands are stored in an internal command queue for later execution), the amount of power required to execute the commands decreases. In some embodiments, a power savings of sixty percent or more may be realized when commands are stored in a command queue and executed once a queue depth threshold associated with the command queue has been reached.

Figure 3:
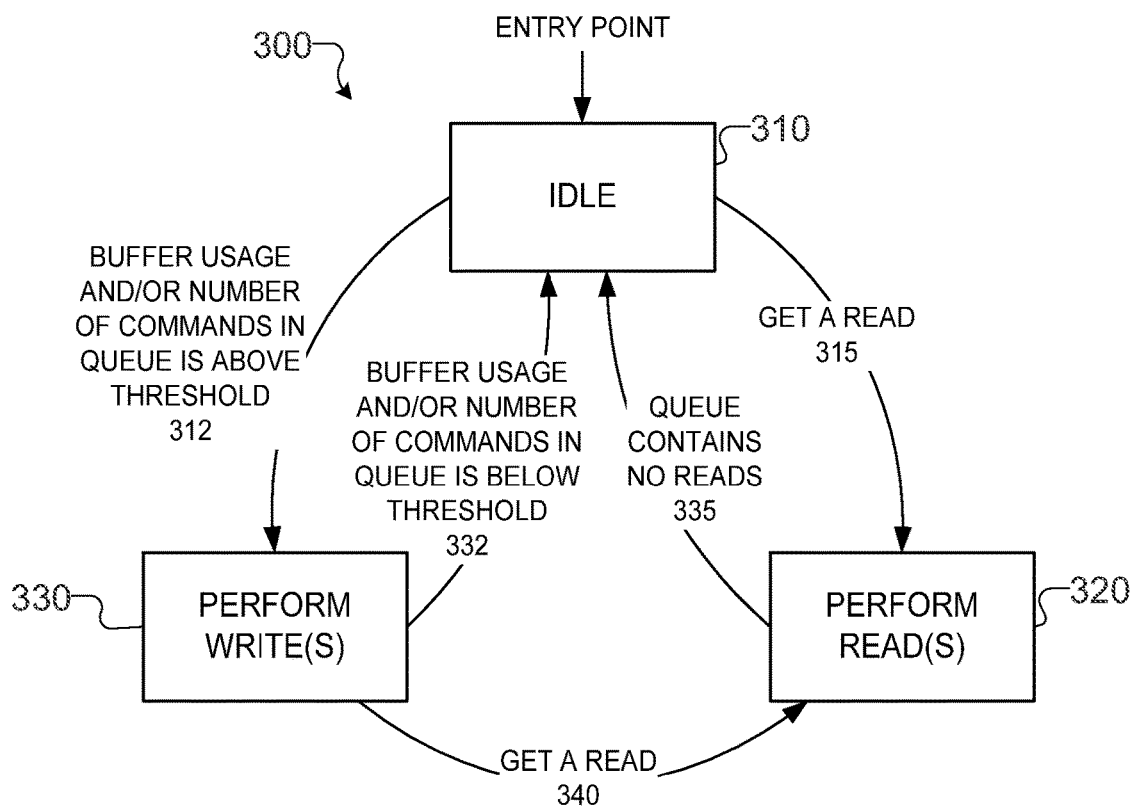
FIG. 3 illustrates a state machine that may be used to execute various read and write commands according to one or more embodiments of the present disclosure.

FIG. 3 illustrates a state machine 300 that may be used to execute various read and write commands according to one or more embodiments of the present disclosure. In some embodiments, the state machine 300 may be used in conjunction with the system 100 described above, and may be implemented in the processing unit or control circuitry 135 of the storage device 120.

As shown in FIG. 3, the entry point of the state machine 300 is when a storage device, such as, for example, storage device 120 (FIG. 1) is in an idle state 310. The idle state 310 is a state in which commands are not executed by the storage device. In the idle state, the storage device consumes a minimal amount of energy. Although an idle state is specifically discussed, the state machine 300 may perform these operations when the storage device is or a storage system is in a reduced power state (including executing commands at a slower rate than the rate that new or additional commands are received).

As shown in the state diagram 300, the storage device may remain in the idle state 310 until a command is received. In some embodiments, the command is received from a host device. In another embodiment, the storage device may remain in the idle state 310 until a command is retrieved from a command queue, such as, for example, the internal command queue of the storage device. As discussed above, the command that is received or retrieved may be a read command or a write command Regardless of whether the commands are received directly from a host device or retrieved from a command queue, when the command is read (identified in the state diagram as the transition "get a read" 315) the storage device performs the requested read command at state 320. In some embodiments, multiple read commands may be received from the host device and/or retrieved from the command queue. As such, the read commands are performed until the command queue contains no reads (shown by the transition "queue contains no reads" 335) or contains substantially no reads (e.g., the queue depth of the command queue reaches a minimum threshold). Once this occurs, the storage device reenters the idle state 310.

In some embodiments, the system memory may include a determination module configured to determine whether the received commands are write commands or read commands. If the received command is a read command, the read command may be executed and the results returned to the host device without storing the received read command in the internal command queue. However, once the reads have been executed, the storage device 120 returns to the idle state 310 such as discussed above. If the received command is a write command, the write command is stored in an internal command queue that is associated with the storage device 120.

Referring back to FIG. 3, if the received command is a write command, the storage device remains in the idle state until the internal command queue has stored a predetermined number of commands and/or the power safe write buffer is above a threshold capacity (e.g., the buffer is 80% full). This is shown in the transition "buffer usage and/or number of commands in queue above threshold" 312. If the buffer usage and/or the number of queued commands exceeds the threshold, one or more write commands in the internal command queue are executed 330. The write commands continue to be executed until a depth of the internal command queue is below a predetermined threshold and/or a minimum capacity threshold is reached in the power safe write buffer (e.g., the buffer is 20% full). This is shown in the transition "buffer usage and/or number of commands in queue below threshold" 332. If the buffer usage and/or the number of queued commands falls below the threshold, the storage device 120 reenters the idle state 310. In one embodiment, the thresholds in transitions 312 and 332 are different. In another embodiment they may be the same.

In some embodiments, as writes are being performed, the storage device may be required to perform a read command (shown by transition 340), or a read command may be encountered in the command queue. In such circumstances, flow proceeds to state 320 in which the read operation is performed and the information is returned to the host device. Once the read has been performed and the read queue is empty (shown by transition 335), the storage device may return to the idle state 310.

Figure 4:
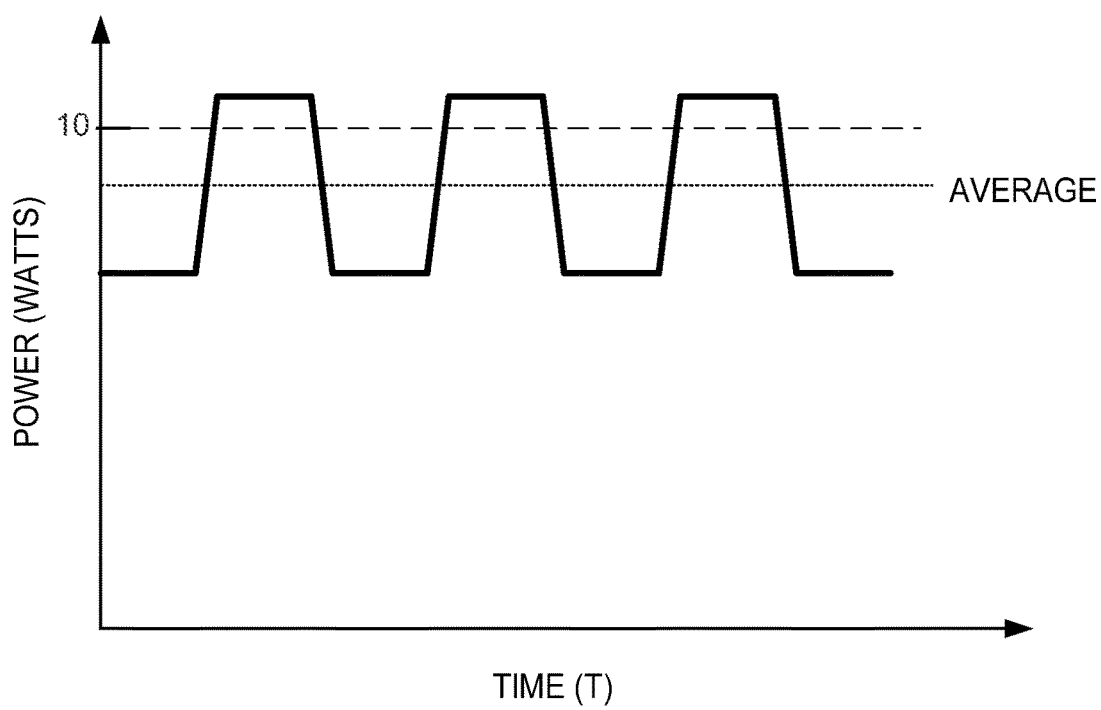
FIG. 4 is a graph that illustrates the power consumption of executing various read and write commands according to one or more embodiments of the present disclosure.

FIG. 4 is a graph that illustrates exemplary power consumption levels of executing various read and write commands according to one or more embodiments of the present disclosure. More specifically, FIG. 4 illustrates how alternating between executing commands (e.g., write commands or random write commands) when the internal command queue depth is high and idling can provide power savings to a system.

In the graph of FIG. 4, the solid line denotes an instantaneous power usage while the dotted line shows average power usage. The low points on the solid line in the graph represent an exemplary amount of power that is used when the storage device is idle. For example, in the idle state, the storage device may consume approximately 7.7 watts of power. However, executing a read command or a write command, represented by the high points on the solid line, may require approximately 10.7 watts of power, due primarily to actuation mechanics needed for seeking. Although the execution of these commands may still require the 10.7 watts of power, by queueing the commands until a threshold is reached such as described herein, the storage device may use the higher level of power (e.g., 10.7 watts of power) for less time than would otherwise be required. As such, the storage device uses less power over a given time period. Alternating between an idle state and an active state of writing high queue depth random writes essentially pulse-width modulates power. Accordingly, and as shown in FIG. 4, over a given time period T, the average amount of power that is required for the commands (e.g., the write commands) is reduced.

Figure 5:
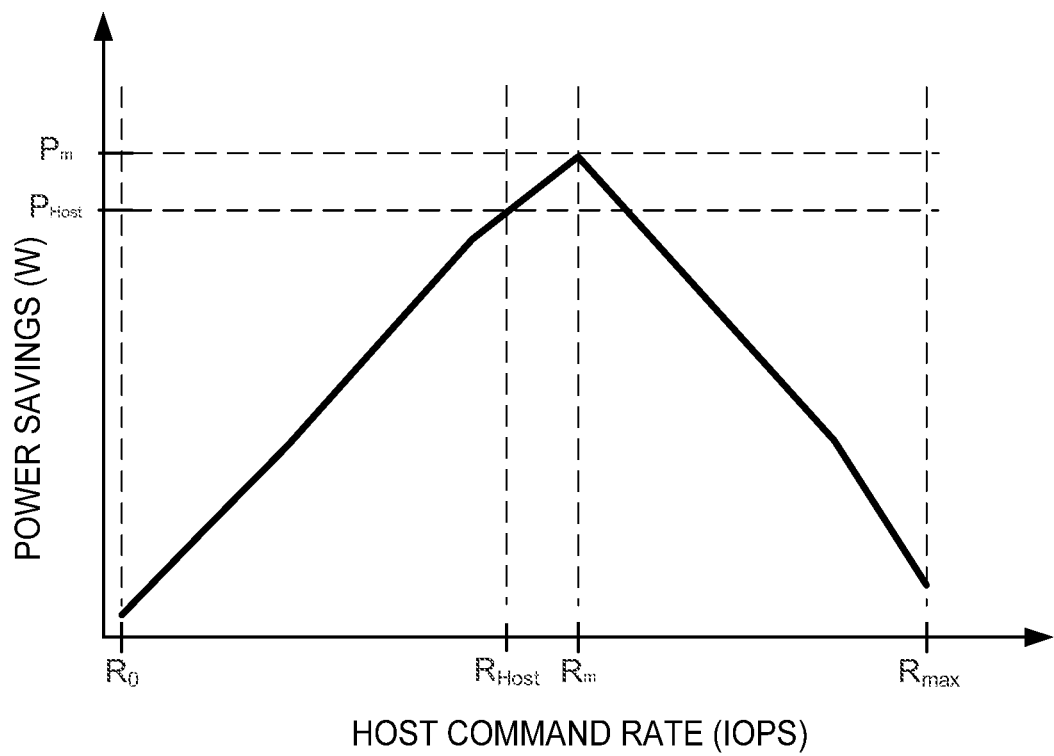
FIG. 5 is a graph that illustrates potential power savings that may be achieved by using one or more embodiments of the present disclosure.

FIG. 5 is a graph that illustrates potential power savings that may be achieved by using one or more embodiments of the present disclosure. More specifically, FIG. 5 illustrates an amount of power savings that may be realized by the storage device or a system as a rate of commands (R) of the host device increases (as measured by Input/Output Operations per Second (IOPS)). The power saving is measured in terms of a difference between (1) power usage of the storage device using one or more embodiments of the disclosure versus (2) power usage of the storage device without using one or more embodiments. In some implementations, the number of IOPS are dependent on the seek times associated with the storage device. Thus, as the number of IOPS increases, the amount of power that may be saved also increases.

For example, as shown in FIG. 5, the power savings achieved by the storage device may steadily increase until a median or peak is reached in the host command rate (having sufficient amount of commands to collect together to realize the saving). However, as shown in the graph, if the host command rate exceeds the median, the power savings benefit begins to decrease (as there is less opportunity to go into the idle state). As such, it is desirable to find a certain number of IOPS that will grant a power savings without sacrificing performance. As such, the rate of the operations sent from the host ($R_{Host}$) may be at a rate that is as close as possible to the median rate ($R_m$) such as shown on the graph but also yields a power savings ($P_{Host}$) close to peak or optimal power savings ($P_m$).

Figure 6:
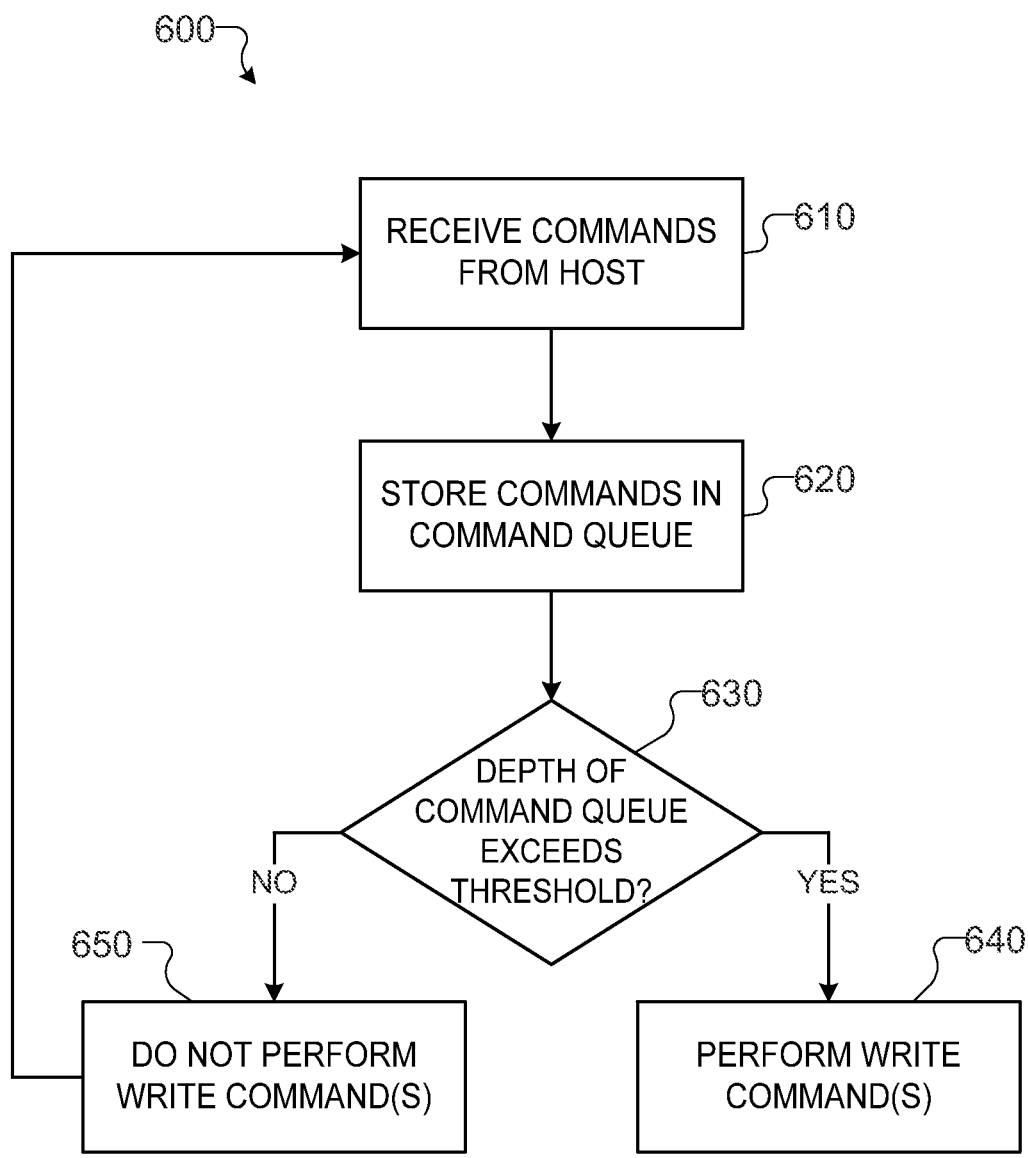
FIG. 6 is a block diagram illustrating a method for writing commands to a data storage device according to one or more embodiments of the present disclosure.

FIG. 6 is a block diagram illustrating a method 600 for writing commands to a storage device according to one or more embodiments of the present disclosure. In some embodiments the method 600 may be used for executing various types of commands including write commands such as described herein. In additional embodiments, the method 600 may be used in conjunction with the system 100 shown and described above with respect to FIG. 1

Method 600 begins when a command is received at operation 610 from a host device such as, for example, host device 110 shown and described above with respect to FIG. 1. The received command may be a write command including a sequential write command or a random write command.

Once the command has been received from the host device, the received command may be stored 620 in an internal command queue. In some embodiments, the internal command queue may be a power safe write buffer that is configured to store the received commands and/or data associated with the received commands until the commands are actually executed and/or written to a storage location in the system memory. As discussed above, although the command may not actually have been executed by the storage device, the storage device may send a response to the host device that the command has been received and successfully executed.

Once a command has been received and stored in the internal command queue, the depth of the command queue is checked to determine if the depth of the command queue exceeds a predetermined threshold. For example, if the command queue can hold up to sixty-four commands and the threshold amount of stored commands is fifty, a determination may be made as to whether at least fifty write commands have been received and stored in the internal command queue.

If the threshold has not been met or exceeded, flow proceeds to operation 650 and the write commands that are stored in the queue are not performed. The flow moves back to operation 610 in which another command is received from the host device and the process repeats.

However, if operation 630 determines that the queue depth of the internal command queue does exceed the predetermined threshold (e.g., more than fifty write commands are stored in the internal command queue), flow proceeds to operation 640 and one or more write commands in the internal command queue are executed. In some embodiments, operation 640 may be used to flush out the entire command queue. For example, if the depth of the command queue was fifty commands, operation 640 may require that all fifty commands are executed before any additional write commands are stored in the command queue.

In another embodiment, the depth of the command queue may be required to reach a minimum threshold or threshold capacity before the stored commands are no longer executed. Continuing with the example above, if the threshold to trigger operation was fifty commands such as described above, the data storage device may continue to execute the commands until the ten commands remained in the command queue. Once this occurs, the commands from the host are once again stored in the internal command queue. Once this point is reached, the flow proceeds back (not shown) to operation 610 and the process repeats.

In the embodiments described above, the received commands may be stored in the internal command queue without being executed until a queue depth reaches a predetermined depth. However, in some embodiments, any implementation in which the storage device is able to save power while still performing various write commands at a rate that is greater than host command rate is desirable.

For example, in an alternative or additional embodiment, a write performance of a data storage device with a power safe write buffer may be artificially slowed such that the rate of write commands received from the host occurs at a higher rate. Thus, although writes are still being performed, the rate at which the write commands are being received versus the rate at which the writes are being performed causes the depth of the internal command queue to increase. As a result, the depth of the command queue will eventually reach the predetermined depth. Once that point is reached, the commands in the command queue are executed such as described above.

In another implementation, the storage device may be configured to arbitrarily slow actuator seeks when commands are being received from the host device at a slower rate. As a result, power may be saved during the acceleration and deceleration seek phases of writes and/or random writes. In alternative embodiments, the drive may only slow actuator seeks for writes that are to be stored or protected by a power safe write buffer or only when a certain number of commands have been stored in the power safe write buffer.

In yet another embodiment, when determining what commands are to be executed, ladder or elevator sort commands may be used rather than rotational positional ordering sort commands such as described above. In these cases, elevator sorting results in relatively short seeks between commands and thus saves power. Additionally, elevator sorting commands may cause relative long excess latencies which may allow seeks to be slowed. As a result of the slower seeks, less power is consumed. In still yet other embodiments, the elevator sorting may be triggered by low IOPS or when the depth of the command queue is relatively low.

In another implementation, the speed of rotation of the disk may be slowed when commands received from the host device are relatively slow or low. In some embodiments, this may greatly affect power savings as spin power of a disk may represent a signification amount of power in the total drive power of the data storage device.

In still yet other embodiments, write commands, and more specifically data of those write commands, that are associated with a media based cache may be pushed out to a primary data storage in addition to the write commands received from the host device. This implementation may also save power.

Although specific examples have been given, embodiments described herein are directed to saving power by writing data or executing write commands at a rate that is greater than the rate at which the commands are being received from the host. As a result, the received commands can be stored and later executed when a threshold amount of commands have been received.

Figure 7A:
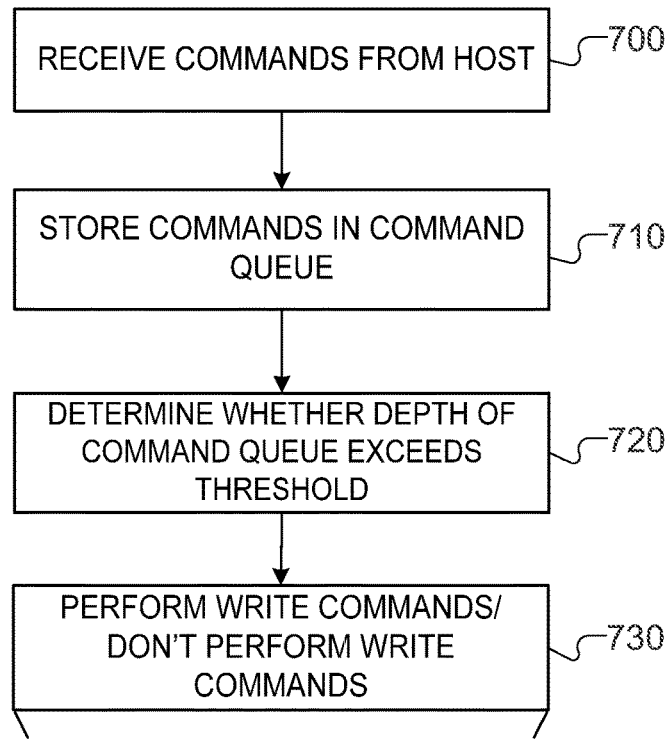
FIGS. 7A and 7B are a block and flow diagram combination that illustrates a method for writing data into a storage device according to one or more embodiments of the present disclosure.
Figure 7B:
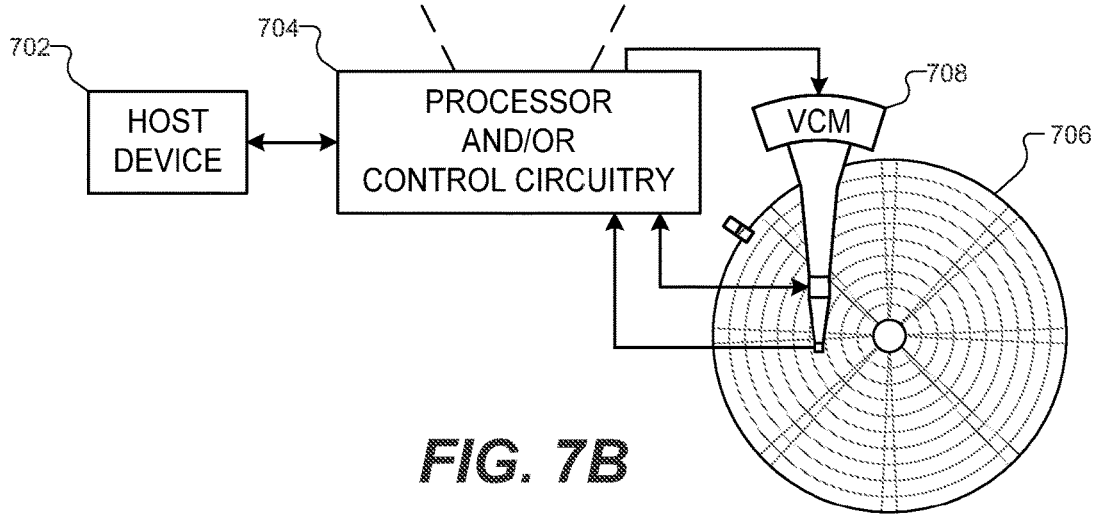

FIGS. 7A and 7B show a block and flow diagram combination that illustrates a method for writing data into a storage device according to one or more embodiments of the present disclosure. The method of FIG. 7A begins at operation 700 in which commands are received from a host device. Flow then proceeds to operation 710 in which the received commands are stored in a command queue. In some embodiments, the commands in the command queue may be sorted using rotational positional order, elevator sorting and so on.

Once the commands have been stored in the command queue, flow proceeds to operation 720 and a determination is made as to whether the depth of the command queue exceeds predetermined threshold. Upon determining that the depth of the command queue exceeds the threshold, the write commands in the command queue are executed at operation 730. However, upon determining that the depth of the command queue does not exceed the predetermine threshold, the commands in the command queue are not written.

In many embodiments, the method of FIG. 7A can be implemented by a data storage device, such as depicted by the simplified flow chart of FIG. 7B. As one example, the data storage device can include a processor 704 that can perform or coordinate one or more of the operations of the data storage device. The processor 704 can be connected to a voice coil motor 708 ("VCM") that controls the location of a read head and a write head along a rotatable disk 706 that is formed from a magnetic material. The processor 704 may also communicate with one or more host devices 702.

As used herein, "non-volatile solid-state memory," "non-volatile memory," "NVM," or variations thereof may refer to solid-state memory such as NAND flash. "Non-volatile memory" may additionally refer to rotating magnetic media. However, embodiments of the present disclosure may also be useful in other hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

Additionally, embodiments of the present disclosure are described above with reference to block diagrams and operational illustrations of methods and the like. The operations described may occur out of the order as shown in any of the figures. One or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. A method for writing data to a data storage system, comprising:
   receiving, at a storage device, a plurality of write commands from a host device;
   storing, at the storage device, the plurality of write commands in an internal command queue unique from a host command queue;

determining whether a depth of the internal command queue exceeds a predetermined command queue depth, the predetermined command queue depth based on an average amount of power consumed by the storage device when executing write commands;

upon determining that the depth of the internal command queue exceeds the predetermined command queue depth:

performing one or more write commands in the internal command queue, wherein each performed write command writes data to a primary non-volatile memory of the data storage system and causes the depth of the internal command queue to decrease and wherein the one or more write commands are performed until the depth of the internal command queue reaches a minimum threshold; and upon determining that the depth of the internal command queue does not exceed the predetermined command queue depth:

causing the storage device to not perform a write.

2. The method of claim 1, wherein the storage device comprises a power safe write buffer.

3. The method of claim 2, further comprising, upon determining that the power safe write buffer contains an amount of data greater than a threshold amount of data, performing one or more write commands in the internal command queue.

4. The method of claim 2, wherein the power safe write buffer comprises a non-volatile memory device.

5. The method of claim 2, wherein the power safe write buffer is a volatile state memory device protected by a non-volatile memory device.

6. The method of claim 1, further comprising ordering the one or more write commands using rotational positional ordering.

7. The method of claim 1, wherein the plurality of write commands are random write commands.

8. The method of claim 1, further comprising, in response to receiving the plurality of write commands, communicating to the host device that the plurality of write commands have been written to the storage device.

9. The method of claim 1, wherein the depth of the internal command queue is different from a depth of an internal write command queue and wherein the depth of the internal write command queue of the storage device is independent from a depth of a write command queue of the host device.

10. The method of claim 1, wherein performing one or more write commands in the internal command queue comprises slowing a seeking motion of an actuator of the storage device.

11. The method of claim 1, wherein performing one or more write commands in the internal command queue comprises using an elevator sorting method to select the write commands in the internal command queue for execution.

12. The method of claim 1, wherein performing one or more write commands in the internal command queue comprises spinning a disk of the storage device at a lower spin rate than when the rate of write commands received from the host device is above the threshold.

13. The method of claim 1, wherein the storage device performs write commands associated with pushing out data from a media based cache to a primary data storage in addition to the write commands received from the host device.

14. A non-transitory computer-readable storage medium encoding computer executable instructions which, when executed by a processor, performs a method for writing data to a data storage system, the method comprising:

receiving, at a storage device, a plurality of write commands from a host device;

storing, at the storage device, the plurality of write commands in an internal command queue unique from a host command queue;

determining whether a depth of the internal command queue exceeds a predetermined command queue depth, the predetermined command queue depth based, at least in part, on an average amount of power consumed by the storage device when executing write commands;

upon determining that the depth of the internal command queue exceeds the predetermined command queue depth:

performing one or more write commands in the internal command queue, wherein each performed write command writes data to a primary non-volatile memory of the data storage system and causes the depth of the internal command queue to decrease and wherein the one or more write commands are performed until the depth of the internal command queue reaches a minimum threshold; and upon determining that the depth of the internal command queue does not exceed the predetermined command queue depth:

causing the storage device to not perform a write.

15. The non-transitory computer-readable storage medium of claim 14, further comprising instructions for ordering the one or more write commands using rotational positional ordering the one or more write commands using rotational positional ordering.

16. A data storage device, comprising:

data storage memory; and a controller configured to:

receive a plurality of write commands from a host device;

store the plurality of write commands in an internal command queue;

perform one or more write commands in the internal command queue at a first rate;

determine whether a depth of the internal command queue exceeds a predetermined command queue depth that is based on an average amount of power consumed by the data storage device when executing write commands stored in the internal command queue; and upon determining that the depth of the internal command queue exceeds the predetermined command queue depth:

perform one or more write commands in the internal command queue at a second rate that is different than the first rate, wherein each performed write command at the second rate causes the depth of the internal command queue to decrease and wherein the one or more write commands are performed at the second rate until the depth of the internal command queue reaches a minimum threshold.

17. The data storage device of claim 16, wherein the storage device comprises a power safe write buffer.

18. The data storage device of claim 17, further comprising, upon determining that the power safe write buffer contains an amount of data greater than a threshold amount of data, performing one or more write commands in the internal command queue at the second rate.

19. The data storage device of claim 17, wherein the power safe write buffer comprises a non-volatile memory device.

20. The data storage device of claim 17, wherein the power safe write buffer is a volatile state memory device protected by a non-volatile memory device.

\* \* \* \* \*